Patented June 9, 1925.

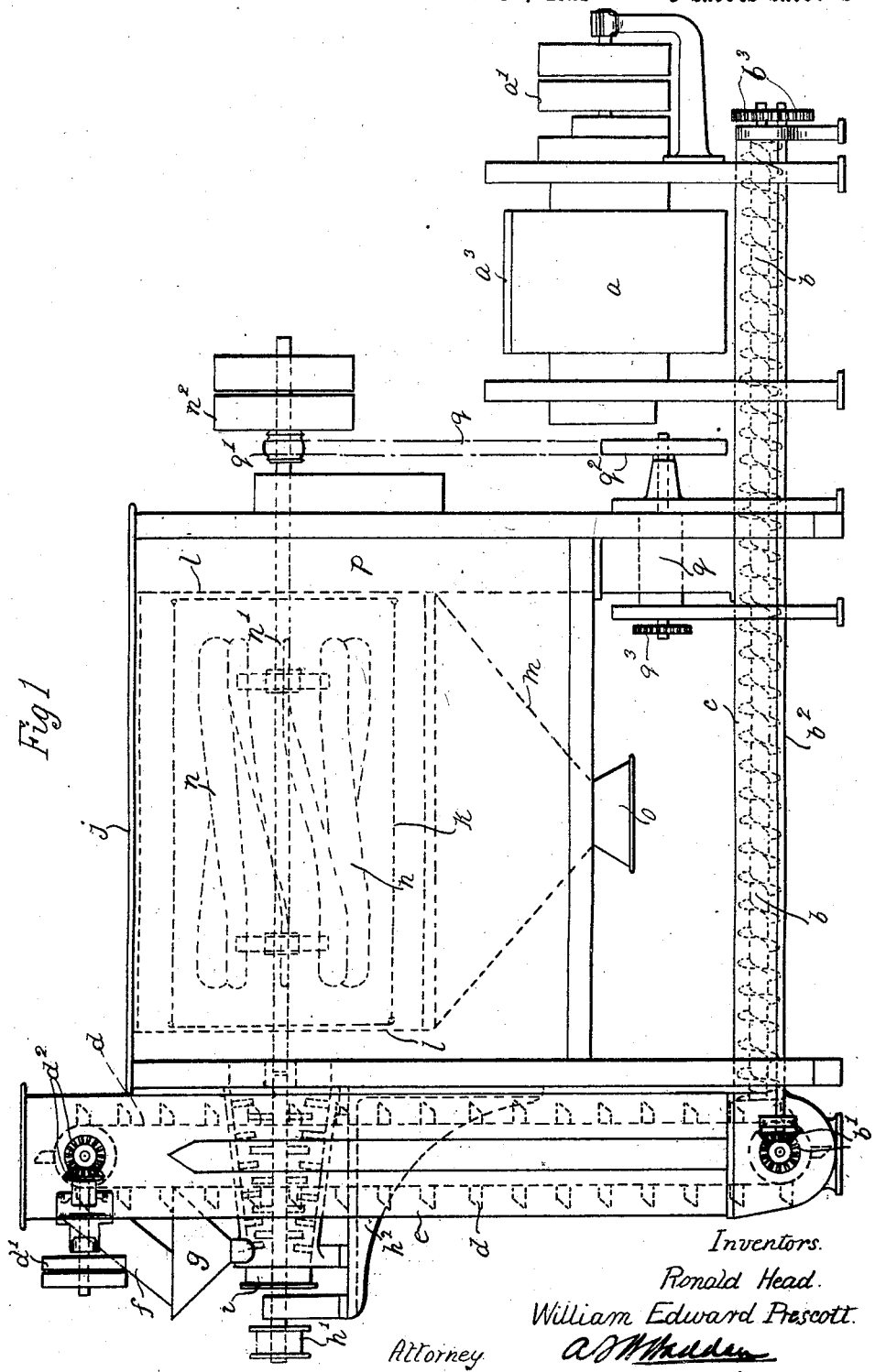

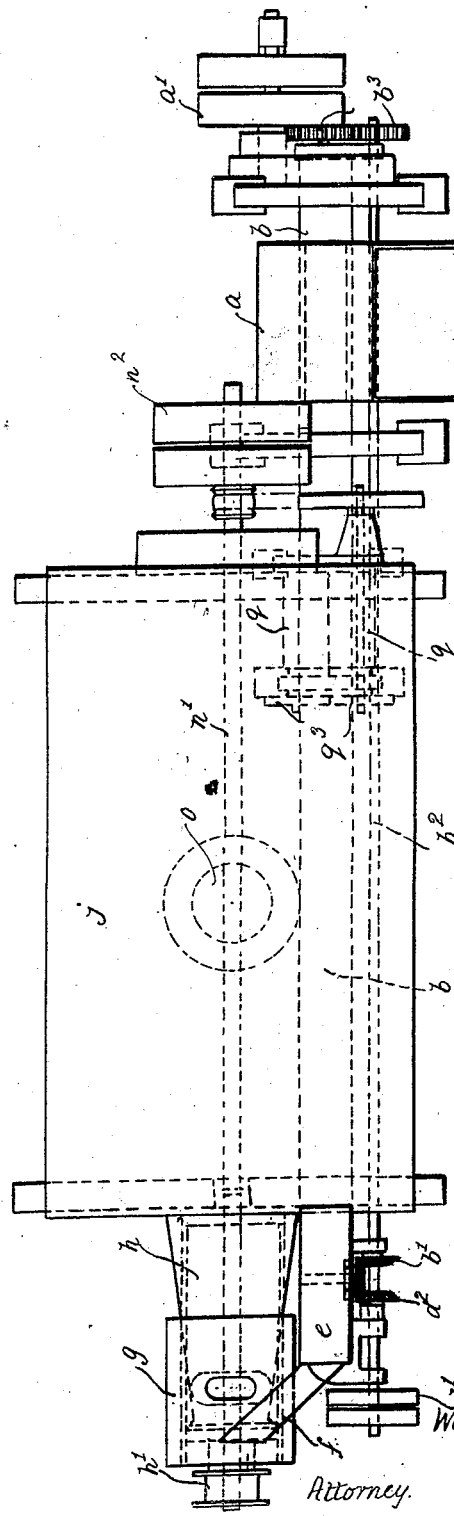

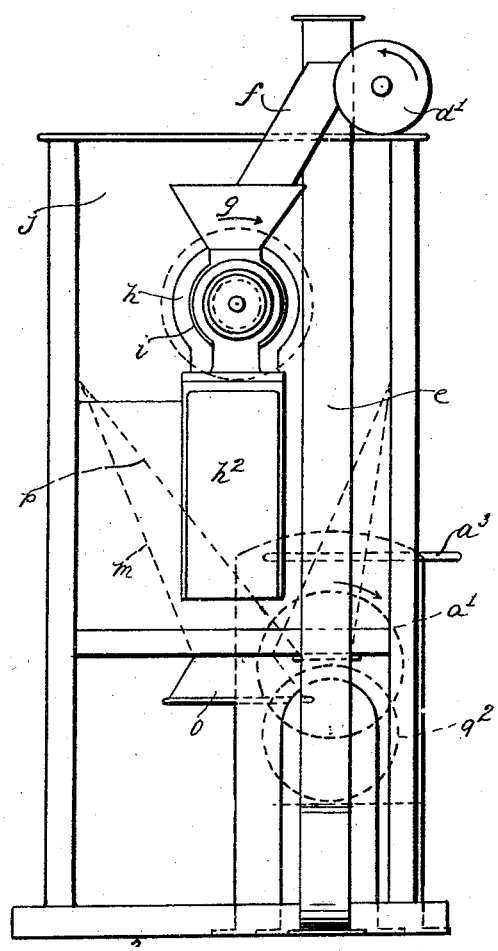

1,541,262

UNITED STATES PATENT OFFICE.

RONALD HEAD, OF LUTON, AND WILLIAM EDWARD PRESCOTT, OF LONDON, ENGLAND, ASSIGNORS TO JOSEPH BAKER, SONS AND PERKINS LIMITED, OF LONDON, ENGLAND, A COMPANY OF GREAT BRITAIN.

TREATMENT OF COCOA AND SIMILAR FOODSTUFFS.

Application filed March 17, 1921. Serial No. 453,092.

*To all whom it may concern:*

Be it known that we, RONALD HEAD, mechanical engineer, of Luton, in the county of Bedford, England, and WILLIAM EDWARD PRESCOTT, engineer, of London, England, both subjects of the King of Great Britain and Ireland, have invented certain new and useful Improvements in the Treatment of Cocoa and Similar Foodstuffs, of which the following is a specification.

This invention relates to the treatment of cocoa and similar food-stuffs and has more particular relation to the treatment of cocoa, wherein it is disintegrated or reduced to a fine powder in a mill by the action of blades, whilst at the same time a continuous current of air for cooling, aerating and ejection purposes is forced through the material.

According to the present invention additional steps and methods of treatment are provided in conjunction or combination with said disintegrating operation and these consist in first feeding the cake of material as from a cocoa butter press to a breaker in which it is broken into lumps. From said breaker the lumps are fed as by a conveyor and elevator to the disintegrating apparatus or mill referred to above, and on leaving same under the action of a current of air as described, the powdered substance passes into a sifting device which may include one or more revolving sieves or sifting cylinders, or comprise fixed cylinders and rotating beaters, or be of any form desired and which deliver the finished product into a hopper or equivalent from which it is taken away to be suitably dealt with, whilst the tailings pass from the sifting device and are conveyed between grinding rolls for instance of granite or chilled iron by which they are again finely powdered and from which they are passed back to the disintegrating mill for further treatment and amalgamation in a similar manner to that already mentioned.

An embodiment of the invention is illustrated in the accompanying drawings, in which:—

Fig. 1 is a side elevation showing more or less diagrammatically the entire combination of apparatus referred to above; Fig. 2 is a plan view, and Fig. 3 an end elevation from the left of Fig. 1. In Figs. 2 and 3 certain parts illustrated in Fig. 1 have been omitted for clearness of illustration.

There is no specific novelty in either the disintegrating mill, the sifting device, or the breaker, all these being of any appropriate or known construction, the invention residing in the particular combination and arrangement of the various parts, which co-operate in the manner previously stated.

The apparatus comprises firstly a breaker $a$, shown merely in outline, for the reason that it may suitably be of the construction disclosed in the application No. 396734, filed 10th July, 1920, to which reference is directed for a full description. The material, for example cocoa, is fed in lumps or cakes as from a cocoa butter press to said breaker, as at $a^3$ and after treatment therein is delivered to a worm conveyor $b$ working in a trough $c$ which extends along the base of the apparatus and which delivers the material to an elevator or bucket conveyor $d$ located in a vertical casing $e$. The material is carried by said elevator $d$ to the top of the apparatus and discharged from the buckets of the elevator into a chute $f$ which delivers it into a hopper $g$ forming part of a conical disintegrating mill $h$. The material is fed into said mill by means of the hopper $g$ and then carried into a sifting device $j$. Such device is also of substantially known form and comprises an open ended cylinder $k$ in the form of a sieve, disposed in a casing $l$ having a discharge chute $m$ and containing beaters $n$ which are rotated within the cylinder $k$ to force the material through the meshes of the cylinder. The finely divided material which passes through the wall of the surrounding cylinder $k$ is delivered by the chute $m$ to the outlet $o$ where it is collected by any convenient means and dealt with as desired.

The tailings, if any, from the cylinder $k$ pass out at the right hand end thereof to a chute $p$, by which they are delivered to a pair of grinding rollers $q$, these rollers being appropriately of granite or chilled iron, and by which the tailings are ground to a fine state of division and delivered again to the worm conveyor $b$, which in turn passes them to the elevator $d$ and thence through the mill $h$ and sifting device $j$, the process being repeated as often as may be necessary.

Any appropriate means for driving the various elements constituting the combination of apparatus described may be adopted. As shown in the drawings the breaker $a$ is driven separately as by pulley $a^1$. The elevator $d$ is driven from pulley $d^1$ through bevel-gear $d^2$ and at the base of the elevator other bevel-gear $b^1$ is arranged through which shaft $b^2$ drives gearing $b^3$ for actuating the worm-conveyor $b$. The mill $h$ is driven independently from pulley $h^1$ and the rotary beaters $n$ in sifting cylinder are driven from a shaft $n^1$ through pulley $n^2$. From shaft $n^1$ belt gear and pulleys $q$, $q^1$ and $q^2$ drive one of the rollers $q$, which is geared, through spur gear $q^3$ to the other roller of the pair in the known manner.

The mill $h$ is shown as carried by a bracket $h^2$ supported from the casing $k^3$ of the sifter, but it may be otherwise mounted as desired.

By the combination and arrangement of devices as above described we are enabled to carry out a substantially continuous process of breaking, disintegrating and sifting with re-treatment of the tailings in a unitary apparatus, the whole occupying a minimum of time and space and resulting in an economical and labour saving operation with greatly improved product.

It will be obvious that with certain materials, it may not be necessary to first break same or to retreat the tailings, and from this point of view the invention may be regarded as a method and means for the combined disintegration and sifting only of the materials dealt with.

What we claim as our invention and desire to secure by Letters Patent of the United States is:—

1. An apparatus for treating cocoa and similar food stuffs comprising a breaker in which the material is first reduced, a disintegrating mill embodying means for producing a current of air on the material under treatment, conveying means for transferring the material from the breaker to the disintegrating mill, a sifting device into which the material treated in the mill is delivered by said air current, means for grinding tailings from the sifting device, and means for delivering the said tailings back to the disintegrating mill for further treatment.

2. An apparatus for treating cocoa and similar food stuffs comprising a breaker in which the material is first reduced, a disintegrating mill embodying means for producing a current of air on the material under treatment therein, worm and bucket conveyors for transferring the material from the breaker to said disintegrating mill, a sifting device into which the material treated in the mill is delivered by said air current, and means for grinding tailings from the sifting device, said tailings being delivered from the grinding means to the aforesaid worm conveyor and subsequently to the bucket conveyor for passage back to the disintegrating mill for further treatment.

In witness whereof we have signed this specification in the presence of two witnesses.

RONALD HEAD.
WILLIAM EDWARD PRESCOTT.

Witnesses:
   MABEL E. MARTIN,
   EVA HAZEL.